United States Patent [19]

Chana

[11] 4,086,827
[45] May 2, 1978

[54] FOUR-SPEED TRANSMISSION

[75] Inventor: Howard E. Chana, Troy, Mich.

[73] Assignee: General Motors Corporation, Detroit, Mich.

[21] Appl. No.: 606,501

[22] Filed: Aug. 21, 1975

[51] Int. Cl.² ............................................. F16H 57/10
[52] U.S. Cl. ....................................... 74/759; 74/753
[58] Field of Search .................. 74/759, 763, 751, 753

[56] References Cited

U.S. PATENT DOCUMENTS

| | | | |
|---|---|---|---|
| 2,620,685 | 12/1952 | Smirl | 74/759 |
| 2,813,437 | 11/1957 | Kelbel et al. | 74/759 |
| 3,103,832 | 9/1963 | Foerster | 74/759 |
| 3,483,771 | 12/1969 | Forster et al. | 74/759 |
| 3,602,055 | 8/1971 | Hause | 74/759 |
| 3,611,835 | 10/1971 | Borman | 74/759 |
| 3,802,294 | 9/1974 | Smirl | 74/759 |

Primary Examiner—Benjamin W. Wyche
Assistant Examiner—Wesley S. Ratliff, Jr.
Attorney, Agent, or Firm—D. F. Scherer

[57] ABSTRACT

A four-speed planetary transmission providing two underdrive ratios, a direct drive ratio, an overdrive ratio and a reverse ratio is disclosed. Three selectively operable friction clutches and two friction brakes are provided to connect the transmission input to the planetary gearing arrangement and to establish the above speed ratios. One of the clutches has serially disposed therewith a one-way clutch which is operable on a 3-4 upshift or, a 4-3 downshift or, a 4-2 downshift to provide a controlled drive path so that simultaneous overlapping of other friction drive establishing devices in the transmission is avoided during these ratio changes.

3 Claims, 2 Drawing Figures

FOUR-SPEED TRANSMISSION

This invention relates to four-speed power transmissions and more particularly to four-speed power transmissions wherein shift timing is controlled by a one-way device.

Prior art patents, such as U.S. Pat. No. 3,611,835 issued to August H. Borman on Oct. 12, 1971, disclose the use of one-way devices for the elimination of friction device overlap, which affects shift feel, during ratio changes in a planetary transmission having four forward speed ratios. However, in the prior art patents, two or more one-way devices are used for overlap timing control during the 3-4 upshift or the 4-3 downshift or, the 4-2 downshift. With a four-speed overdrive transmission these ratio changes generally occur the most frequently and operator shift feel during these changes is an important consideration in evaluating transmission smoothness.

The present invention uses a single one-way clutch disposed in series power flow between an input friction clutch and a gear member of the planetary gear arrangement. The input friction clutch is engaged during all of the forward driving speed ratios. The one-way clutch permits the gear member to overrun the input during the overdrive ratio so that, on a 3-4 upshift, the application of a friction brake is accomplished without the timed release of the input friction clutch. On a 4-3 or 4-2 downshift, the input accelerates to match the speed of the gear member by running up against the one-way clutch upon the disengagement of the friction brake or another friction clutch, respectively. During these downshifts, there are no friction member engagement overlap considerations necessary to effect the proper shift timing.

It is therefore an object of this invention to provide in a four-speed planetary transmission with overdrive an improved power input arrangement wherein a friction clutch and a one-way clutch are serially arranged between the power input and a gear member of the planetary arrangement to provide a controlled input drive path so that during the 3-4, 4-3 or 4-2 speed ratio changes, simultaneous overlap of friction member is not necessary.

Another object of this invention is to provide an improved four-speed transmission having two simple planetary gear sets which have members thereof interconnected, three friction clutches interconnected with the planetary gear sets to provide three input members, two brakes connected to members of the planetary gear sets and a one-way clutch serially arranged between one of the friction clutches and a gear member of one of the planetary gear sets, wherein the clutches and brakes are selectively engageable to establish four forward speeds and a reverse speed in the transmission, and wherein the one friction clutch is engaged for all forward drive ratios and the one-way clutch is operable to provide a controlled drive path during ratio changes of a 3-4 upshift or, 4-3 downshift or, 4-2 downshift without timed overlapping operation of the other clutches and brakes during these ratio changes.

These and other objects and advantages of the invention will be more apparent from the following description and drawings in which.

Figure 1:
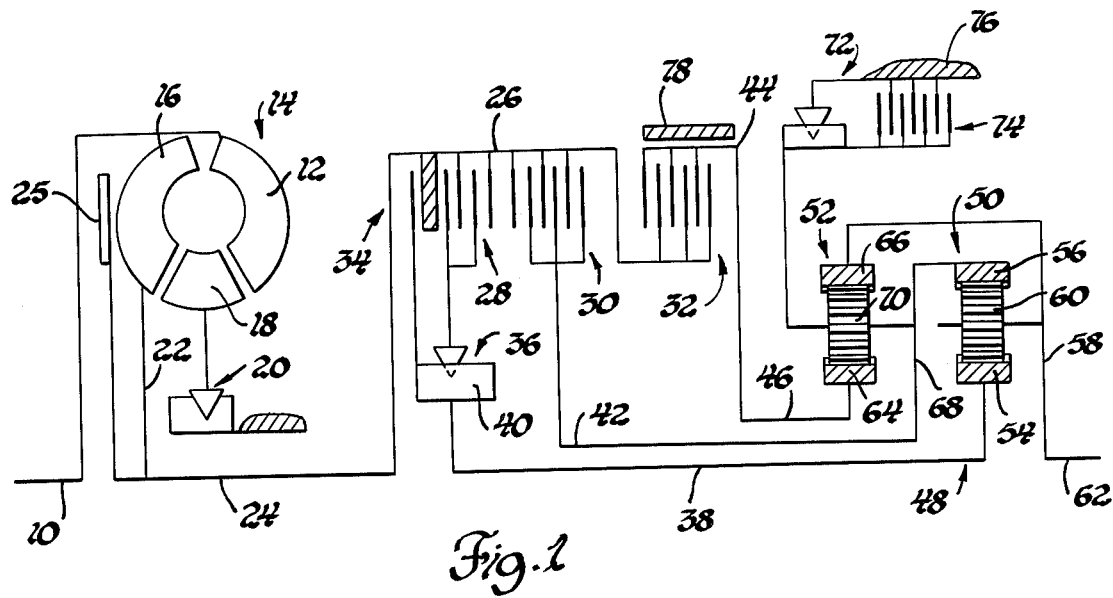
FIG. 1 is a schematic drawing of a transmission utilizing the invention.

Referring to the drawings wherein like characters represent the same or corresponding parts, there is shown in FIG. 1 a transmission having an input member 10 adapted to be drivingly connected to an internal combustion engine, not shown, and also is drivingly connected to an impeller 12 of a torque converter, generally designated, 14. The torque converter 14 also includes a turbine 16 and a stator 18, which stator 18 is connected through a one-way device 20 to ground. The turbine 16 has an output portion 22 which is drivingly connected to a transmission input shaft 24. Also connected to the transmission input shaft 24 is a lockup clutch 25 which may be selectively engaged to connect the transmission input shaft 24 to the input member 10 thereby providing a direct mechanical input drive to the transmission bypassing the converter 14. The converter 14 is a conventional torque converter which, as is well-known, multiplies input torque when the stator member 18 is held stationary by the one-way device 20, and transmits substantially one to one torque when the stator 18 is overrunning and the impeller 12 and turbine 16 are at substantially the same speed. The transmission input shaft 24 is secured to a clutch hub 26 which provides the outer clutch drum for a forward clutch 28, an overdrive clutch 30 and the inner drum for a reverse clutch 32. The member 26 also provides the outer drum for a coast control clutch 34. The forward clutch 28 is connected in series power flow arrangement through a one-way clutch 36 to an intermediate shaft 38, while the clutch 34 is connected to the inner race 40 of the one-way clutch 36 such that when clutch 34 is engaged, the one-way clutch 36 shares the drive torque with clutch 34. On backdrive, during coasting, the clutch 34 transmits the torque from the drive to the converter. The overdrive clutch 30 is drivingly connected to an intermediate shaft 42, and the reverse clutch 32 has an outer drum 44 which is connected to still another intermediate shaft 46.

The intermediate shafts 38, 42 and 46 are drivingly connected to members of a planetary gear arrangement, generally designated, 48. The planetary gear arrangement 48 includes two simple planetary gear sets 50 and 52. The planetary gear set 50 has a sun gear 54, a ring gear 56, a planet carrier 58 and a plurality of pinion gears 60 rotatably mounted on the carrier 58 and meshing with the sun gear 54 and ring gear 56. The sun gear 54 is drivingly connected to the intermediate shaft 38, the ring gear 56 is drivingly connected to the intermediate shaft 42, and the carrier 58 is drivingly connected to a transmission output shaft 62. The planetary gear set 52 includes a sun gear 64, a ring gear 66, a carrier 68 on which is rotatably mounted a plurality of pinion gears 70 meshing with the sun gear 64 and the ring gear 66. The sun gear 64 is drivingly connected to the intermediate shaft 46, the ring gear 66 is drivingly connected to the carrier 58 and output shaft 62, and the carrier 68 is drivingly connected to the ring gear 56 and the intermediate shaft 42. The carrier 68 also has connected therewith a one-way brake 72 and a friction brake 74. The friction brake 74 and one-way brake 72 are grounded to the transmission housing 76. A band brake 78 surrounds the outer clutch drum 44 and is effective when energized to maintain the sun gear 64 stationary.

When the clutch 28 is engaged, the sun gear 54 is driven by the input shaft 24 through the one-way clutch 36, as long as the sun gear 54 attempts to rotate at a speed slower than the transmission input. However, when the sun gear 54 is rotated faster than the input shaft 24, as will be described later, the sun gear 54 is freewheeling. The clutch 30 when engaged drives the carrier 68 and ring gear 56 at a speed equal to the transmission input speed. The clutch 32 when engaged drives the sun gear 64 at a speed equal the transmission input speed. The clutch 34 may be engaged to bypass the one-way clutch 36 in first, second and third speeds of the transmission so that engine braking is available if desired.

The brake 74 when engaged will maintain the carrier 68 and ring gear 56 stationary, while the one-way brake 72 will provide the same braking feature so long as the carrier 68 or ring gear 56 are attempting to rotate in a direction opposite to the input speed. The brake 78 when engaged will maintain the sun gear 64 stationary. The friction clutches and brakes 25, 28, 30, 32, 34, 74 and 78 are each preferably hydraulically actuated in a conventional manner as is well-known in the transmission art. However, these brakes and clutches may be mechanically or electrically energized and deenergized also as is well-known. The clutches and brakes are preferably controlled by a conventional control system, not shown, such that selective engagement and disengagement of the clutches is provided to permit the change in drive ratio in the planetary gear arrangement 48. To establish the first speed forward in the planetary gearing arrangement 48, the clutch 28 is energized thereby driving the sun gear 54 in a forward direction at the speed of the input member 24 and this results in the ring gear 56 attempting to rotate in the reverse direction which is prevented by the one-way brake 72. Thus, the carrier 58 is driven forward at a reduced speed.

To establish the second speed forward in the transmission, the band brake 78 is engaged. This establishes sun gear 64 as a reaction member in the planetary gearing arrangement 48 which results in the carrier 68 and the ring gear 56 being driven forward through the combined action of the planetary gear sets 50 and 52 such that the one-way brake 72 is free-wheeling. The input drive to the planetary arrangement is through clutches 28 and 36 to sun gear 54.

To establish third speed in the transmission, the clutch 30 is engaged while the band brake 78 is disengaged. This provides a one to one or lockup condition in the planetary gearing arrangement 48 such that the speed of output shaft 62 is equal to the speed of the input shaft 24. The input drive is split between clutches 28, 36 and 30.

To establish fourth speed in the planetary gear arrangement 48, the brake 78 is engaged. With the brake 78 and clutch 30 engaged, the planetary gear set 52 is in an overdrive condition which causes the ring gear 66 to rotate in a forward direction more rapidly than the input shaft 24. This causes sun gear 54 of planetary gear set 50 to rotate in a forward direction more rapidly than the input shaft 24. The one-way clutch 36 permits the sun gear 54 to overrun the friction clutch 28 and input shaft 24. The transmission output shaft is rotated in a forward direction more rapidly than the input shaft 24 with the input drive being through clutch 30.

To establish reverse drive in the planetary gearing arrangement 48, the clutch 32 and brake 74 are engaged while the remaining friction device are disengaged. The brake 74 prevents rotation in either direction of the carrier 68 such that when sun gear 64 is driven forwardly to clutch 32, the ring gear 66 is driven in a reverse direction at a reduced speed. The brake 74 is necessary since the one-way brake 72 will not provide reaction in the required direction during reverse drive.

If the transmission is in fourth gear and a forced downshift to third gear is necessary, either due to increased road load or increased acceleration demand by the operator, the brake 78 will be released and the one-way clutch 36 will arrive at a lockup condition as the engine accelerates when the planetary gearing arrangement 48 is freed by release of the reaction member 64. Thus, it is seen that the one-way clutch 36 will automatically provide input drive pickup on a 4-3 downshift.

On a 4-2 downshift, the clutch 30 is disengaged thus disconnecting instantaneously the planetary gearing arrangement from the input. Thus, the input will accelerate with the reduced load thereon until once again the one-way clutch 36 is in a locked condition such that the input drive will be to the sun gear 54 while the reaction member 78 will remain engaged.

Thus, it is seen from the above description that during a 3-4 upshift or, a 4-3 downshift or, a 4-2 downshift, the shift timing is controlled by the single one-way device 36 such that overlapping of the friction clutches and brakes is eliminated.

Figure 2:
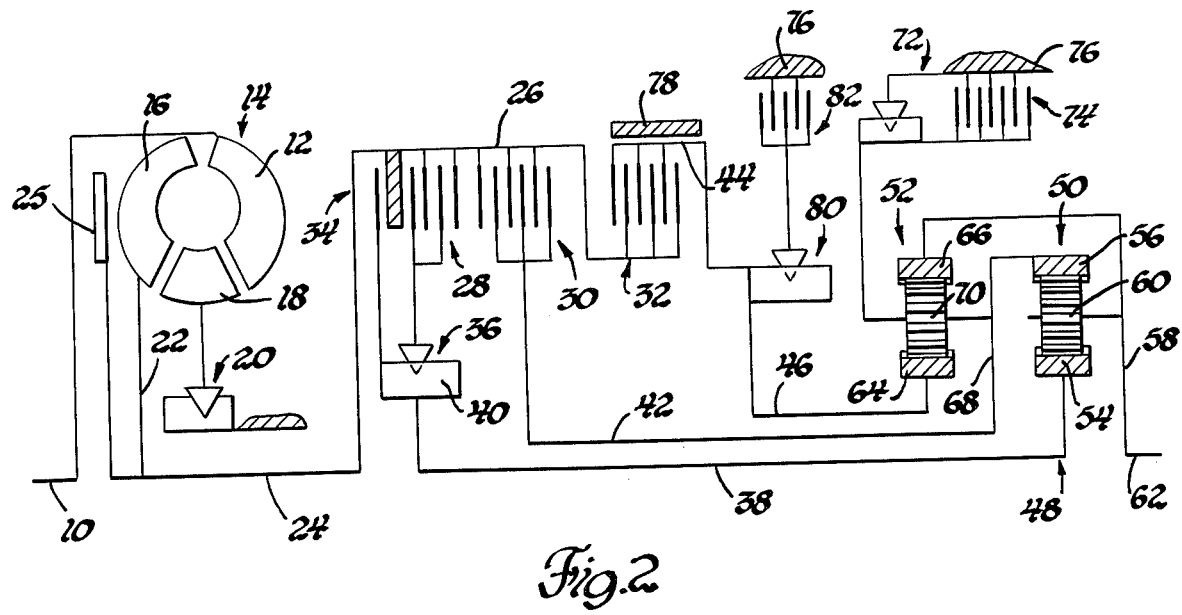
FIG. 2 is a schematic drawing of another embodiment of the transmission utilizing the invention.

The transmission shown in FIG. 2 is substantially the same as the transmission shown in FIG. 1 with the exception that a one-way brake 80 and a friction brake 82 are added to the transmission system in series arrangement between the sun gear 64 and the transmission housing 76. The remaining components are the same as FIG. 1 and have been given the same numerical designation. The two added brakes provide for smooth shift control during a 2-3 upshift and a 3-2 downshift. In the transmission shown in FIG. 2, the second gear ratio is established by engaging the friction brake 82. With the friction brake 82 engaged, the sun gear 64 reacts through the one-way brake 80 to be held stationary in a manner similar to that described when the band brake 78 is engaged in second gear. During a shift from second gear to third gear, simple engagement of the clutch 30 will cause the sun gear 54 to be driven in a forward direction thereby overrunning the one-way brake 80 such that upshifting and downshifting between second and third gears is permitted without the timed overlap of friction devices. The remaining gear ratios are established in the same manner as described above for FIG. 1. However, even in the FIG. 2 transmission, the one-way device 36 still controls the overlap timing during shifting in the fourth to third, or from fourth to second, or from third to fourth during the operation of the transmission. The clutch 25 can be engaged whenever desired to provide more efficient transmission operation. And the clutch 34 can be engaged when it is desired to have engine coast braking during first, second or third gear ratios.

Obviously, many modifications and variations of the present invention are possible in light of the above teachings. It is therefore to be understood that within the scope of the appended claims, the invention may be practiced otherwise than as specifically described.

I claim:

1. In a transmission having input means; output means; and a planetary gear arrangement to establish at least four forward speed ratios and at least one reverse speed ratio including a plurality of gear members, a plurality of brake means a plurality of selectively engageable friction clutch means interconnected with said input means and said planetary gear arrangement, one of said friction clutch means being engaged during all of the forward speed ratios and disengaged during the reverse speed ratio, said other friction clutch means and said brake means are selectively engaged to establish said speed ratios and are selectively interchanged to effect a change from one forward speed ratio to another; the improvement comprising; a one-way clutch serially disposed in drive relation between said one of said clutch means and one of said gear members of said planetary gear arrangement such that said one gear member is driven at a speed not less than the speed of the input means during all forward speed ratios whereby said one-way clutch is operable to provide a controlled drive path from said input means to said planetary gear arrangement during speed ratio changes from third ratio to fourth ratio, or fourth ratio to third ratio, or fourth ratio to second ratio without simultaneous overlapping operation of any of other friction clutch means or brake means to effect the above-desired ratio changes.

2. A four-speed forward and one speed reverse planetary transmission comprising; torque converter means; a transmission input shaft drivingly connected to said torque converter means; selectively engageable forward clutch means operatively connected to said input shaft; selectively engageable overdrive clutch means operatively connected to said input shaft; selectively engageable reverse clutch means operatively connected to said input shaft; a planetary gear arrangement including first and second simple planetary gear sets each having a sun gear, a ring gear, a gear carrier and pinion gears rotatably mounted on said carrier and meshing with said sun gear and ring gear; first brake means operatively connected to said ring gear of said first planetary gear set and said carrier of said second planetary gear set for selectively preventing rotation thereof; second brake means operatively connected to said sun gear of said second gear set for selectively preventing rotation thereof; first drive means for drivingly connecting said overdrive clutch means to said gear carrier of said second planetary gear set; second drive means for drivingly connecting said reverse clutch means to said sun gear of said second planetary gear set; third drive means connected to said sun gear of said first planetary gear set; one-way clutch means drivingly connected between said forward clutch means and said third drive means; and output means drivingly connected to said ring gear of said second planetary gear set and said gear carrier of said first planetary gear set; said forward clutch means being engaged for all forward speeds and cooperating with said one-way clutch means to permit said sun gear of said first planetary gear set to overrun said input shaft during the fourth forward speed, and said one-way clutch means providing a controlled drive path during a 3–4 upshift, or a 4–3 downshift, or a 4–2 downshift without timed overlapping operation of the other clutches and brakes during these ratio changes.

3. A transmission comprising; input means; output means; a planetary gear arrangement having a plurality of torque input paths to establish at least four forward speed ratios and at least one reverse speed ratio; a plurality of brake means operatively connected with the planetary gear arrangement; a one-way clutch; and a plurality of selectively engageable friction clutch means interconnectable between said input means and said planetary gear arrangement, one of said torque input paths including one of said friction clutch means which is engaged during all of the forward speed ratios and said one-way clutch serially disposed in drive relation between said one of said clutch means and said planetary gear arrangement such that one gear member of the planetary gear arrangement is driven at a speed not less than the speed of the input means during all forward speed ratios and said one-way clutch is operable to control the establishment of said one torque input path from said input means to said planetary gear arrangement during speed ratio changes from third ratio to fourth ratio, or fourth ratio to third ratio, or fourth ratio to second ratio without simultaneous controlled overlapping operation of any of other friction clutch means to effect the above-desired ratio changes, said other friction clutch means and said brake means are selectively interchanged to effect a change from one forward speed ratio to another.

* * * * *